United States Patent [19]

Knoll

[11] 4,390,108
[45] Jun. 28, 1983

[54] COVER FOR A HOT LIQUID CONTAINER

[75] Inventor: Dieter Knoll, Kronberg, Fed. Rep. of Germany

[73] Assignee: Braun Aktiengesellschaft, Kronberg, Fed. Rep. of Germany

[21] Appl. No.: 320,384

[22] Filed: Nov. 12, 1981

[30] Foreign Application Priority Data

Nov. 28, 1980 [DE] Fed. Rep. of Germany ....... 3044845

[51] Int. Cl.³ ............................................. B65D 53/06
[52] U.S. Cl. .................................................. 220/228
[58] Field of Search ...................... 220/228, 5; 99/300, 99/301

[56] References Cited

U.S. PATENT DOCUMENTS

| 1,948,820 | 2/1934 | Lasker | 220/228 |
| 3,193,131 | 7/1965 | Smith | 220/228 |
| 4,116,357 | 9/1978 | Stanley, Jr. | 220/228 |

Primary Examiner—George T. Hall
Attorney, Agent, or Firm—Raymond J. De Vellis

[57] ABSTRACT

An upper and lower member define a feed chamber in a cover. An insert in place in the feed chamber to provide fluid communication from outside the cover to the associated container. A liquid blocking layer is formed in the feed chamber when the liquid is poured through the opening of the cover to minimize heat and aroma losses.

3 Claims, 1 Drawing Figure

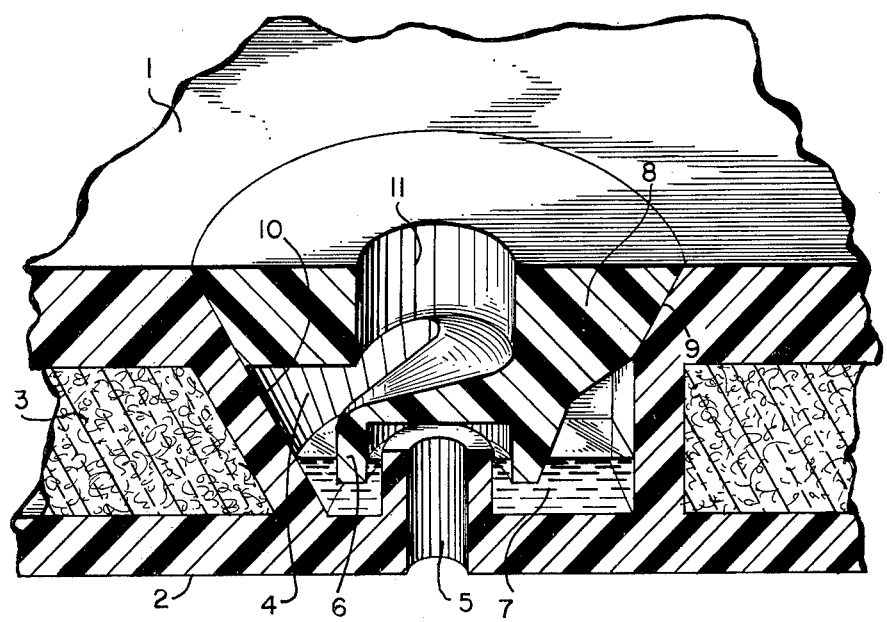

COVER FOR A HOT LIQUID CONTAINER

BACKGROUND OF THE INVENTION

The invention concerns a cover for a hot liquid container such as a thermos coffee pot. Such thermos coffee pots are used, for example, in connection with coffee machines.

In the past, to fill the pot in a coffee machine, the cover of the thermos coffee pot was typically lifted off. As a result, heat and in particular the aroma from the coffee escaped upward from the thermos coffee pot. In addition, the cover of prior thermos coffee pots typically had to be frequently opened and closed. This was often experienced as a bother.

This invention is directed toward a thermos pot which need not be opened for filling and pouring out a hot liquid, such as coffee, and where the least possible loss of heat and aroma occurs when the coffee is being filled in and poured out.

This aim is achieved by utilizing a siphon-like feed action which forms a liquid blocking layer to provide a permanent aroma and heat seal.

As the coffee is poured in through an aperature in the cap, the coffee rises through a blocking layer which consists of coffee and which is formed in the siphon-like feed during the filling of the associated hot liquid container. Only then does the coffee pass into the interior of the thermos coffee pot. Thus, the penetration opening or aperture into the hot liquid container is blocked by a liquid blocking layer in the reverse direction so that practically no loss of aroma or heat can occur.

SUMMARY OF THE INVENTION

It is an object of invention to provide a thermos coffee pot which essentially lessens the handling of the cover.

It is also an object of this invention to provide a removable insert which includes a bell-shaped section which is disposed about a penetration opening defined by an upstanding member.

It is a further object of this invention to provide an insert which is seated with its tapered casing surface on a tapered receiving surface of the feed chamber to provide for easy removal, for example by snapping out of the thermos coffee pot, and to aid in cleaning the insert and feed chamber.

Another advantage of this invention is to provide the bell-shaped section of the insert with a significant depth of penetration into the feed chamber and around the upstanding member. By this measure, one can make certain that, when the thermos coffee pot is at a slant, such as for the purpose of pouring out the coffee, the coffee material located in the siphon-like feed cannot run out therefrom, and cause a loss of the siphon action.

Another favorable development of this invention consists in designing the feed simultaneously as an outlet. By means of this measure, the thermos coffee pot on the one hand is fully sealed with respect to heat and aroma, and on the other hand coffee can be filled into or poured out from the thermos coffee pot without handling a cover. With this development, it is recommended that the feed, which simultaneously is an outlet, be arranged in the cover on the outside near that side which is opposite to the pot handle.

A feed that is simultaneously designed as an outlet provides certain advantages; similar advantages can also be achieved according to another development of the invention, in which a separate outlet is provided.

Just like the feed, this outlet is also designed as a siphon. In this embodiment, one has a particularly great freedom in designing the shape of the thermos coffee pot container.

BRIEF DESCRIPTION OF THE DRAWING

The invention both as to its organization and principles of operation together with further objects and advantages thereof may better be understood by referring to the following detailed description of an embodiment of the invention in conjunction with the accompanying drawing of a cross sectional perspective view of part of the cover for a hot liquid container in accordance with this invention.

DESCRIPTION OF THE PREFERRED EMBODIMENT

The cover shown has an upper member or upper shell 1, a lower member or lower shell 2, and in between an insulation 3. The upper shell 1 is connected in one area of the cover to the lower shell 2, in order to form a feed chamber 4.

The upper and lower shells are preferably initially formed of a synthetic resin and the insulation is preferably formed of glass-wool. A penetration opening 5 with an upstanding wall having a pulled-up edge 6 is provided in the feed chamber 4 and formed as part of the lower shell 2. Edge 6 determines the filling height of a blocking layer 7, which consists of a hot liquid such as coffee, and which collects in the feed chamber 4 when the coffee is poured through an aperature or penetration 11 in the upper shell 1. The coffee collects in the feed chamber 4 before the coffee reaches the interior of the thermos coffee pot, i.e. the hot liquid container. The blocking layer remains in place when the coffee is being poured out. That is, the penetration 11 is formed a certain distance from the casing surface 9, such that, when the coffee is poured out, the quantity of coffee which forms the blocking layer 7 always remains in the feed chamber 4.

The penetration opening 5 is covered toward the top by the bell-shaped section integrally formed as part of insert 8, so that steam cannot flow upwards from the interior of the thermos coffee pot; rather, the path of the steam is blocked by the liquid blocking layer 7. The insert 8 can be formed as a plastic insert with a tapered casing surface 9, seated on corresponding receiving surfaces 10 of the feed chamber 4. Thus, the insert 8 can be withdrawn for the purpose of cleaning the cover.

The cover with the components that have been explained above can be designed so that it exercises not only the function of an inlet but also the function of an outlet.

Alternatively, it is also possible to provide the thermos coffee pot with a separate outlet, which has a siphon-like design, similar to the inlet presented here.

While an embodiment and application of this invention has been shown and described, it will be apparent to those skilled in the art that many more modifications are possible without departing from the invention herein described. For example, this invention is applicable to covers for a variety of hot liquid containers such as a tea pot. An advantage being that the cover need not be opened during the filling of the hot liquid container or during the pouring of the hot liquid to substantially prevent a loss of aroma and heat. The invention, therefore, is not to be restricted except as necessary by the prior art and by the spirit of the following claims.

What is claimed as new and desired to be secured by Letters Patent of the United States is:

1. A cover for a hot liquid container comprising:
   an upper member having a first aperture;
   a lower member disposed beneath said upper member;
   wall means connecting said upper member to said lower member and defining a feed chamber;
   an upstanding member positioned in said feed chamber and connected to said lower members, said upstanding member defining a second aperture providing fluid communication between said feed chamber, through said upstanding member and said lower member and to said hot liquid container; and
   an insert having a third aperture formed therethrough and capable of being inserted in said feed chamber through said first aperture, said third aperture forming a fluid communication from outside said cover to said second aperture of said upstanding member, said insert including a wall portion which, when said insert is inserted in said feed chamber, is disposed about at least a portion of said upstanding member of said lower member, whereas a liquid poured into said third aperture forms a liquid blocking layer in said feed chamber before the liquid travels through said second aperture to the associated hot liquid container.

2. The cover as in claim 1, further including insulation disposed between said upper and lower members.

3. The cover as in claim 2, wherein said insert is generally conical in shape and said first aperture is defined as a tapered casing surface.

* * * * *